Aug. 14, 1934.  H. C. BOWEN  1,969,872
EQUALIZER FOR HYDRAULIC BRAKES
Filed July 20, 1928  2 Sheets-Sheet 1
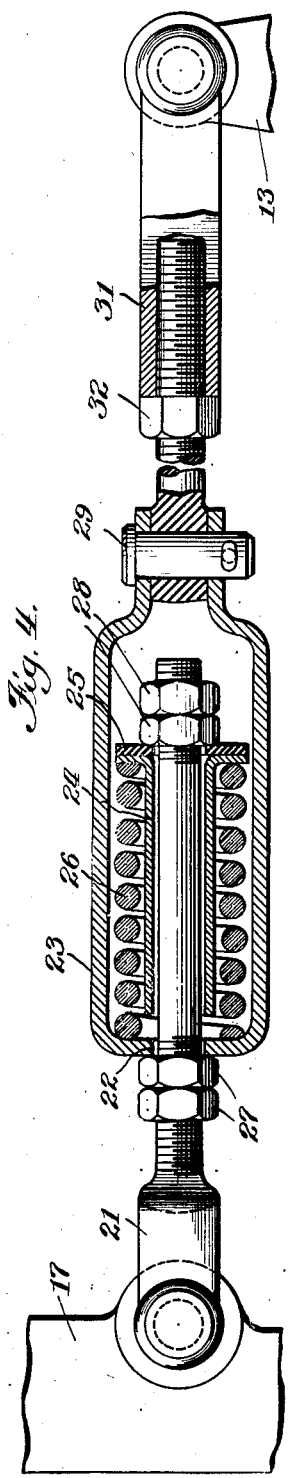
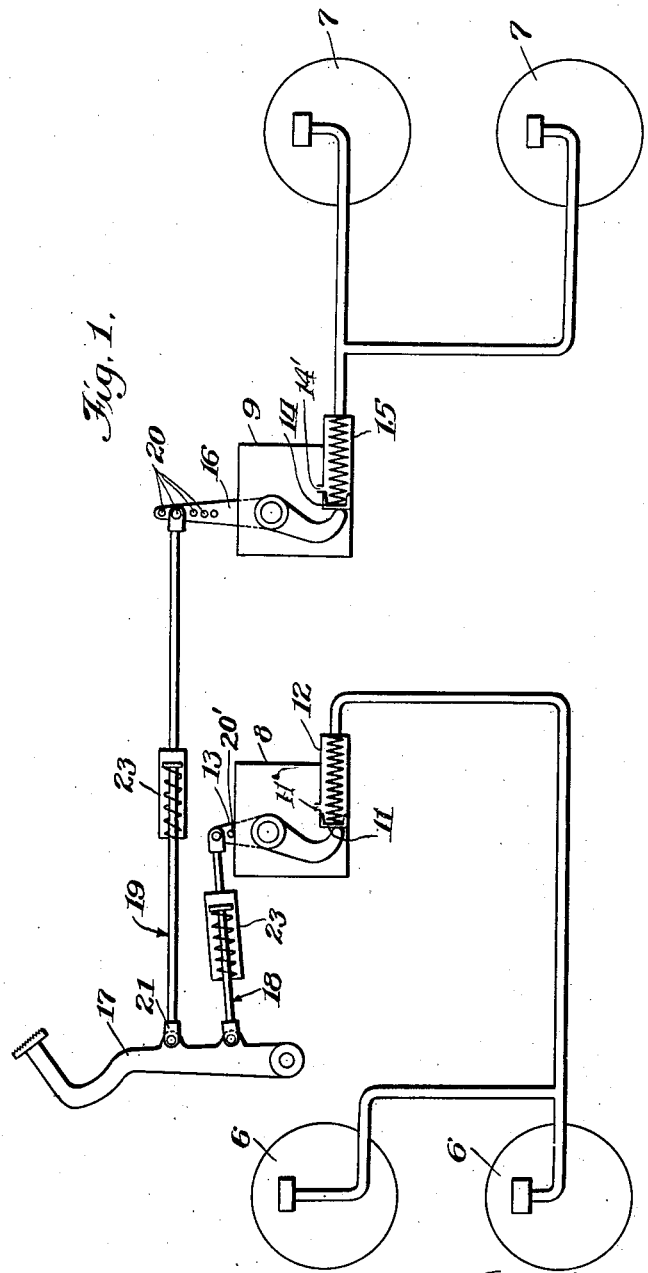
Inventor
Herbert C. Bowen
By Williams, Bradbury, McCaleb & Hinkle
Attys.

Aug. 14, 1934.     H. C. BOWEN     1,969,872
EQUALIZER FOR HYDRAULIC BRAKES
Filed July 20, 1928     2 Sheets-Sheet 2
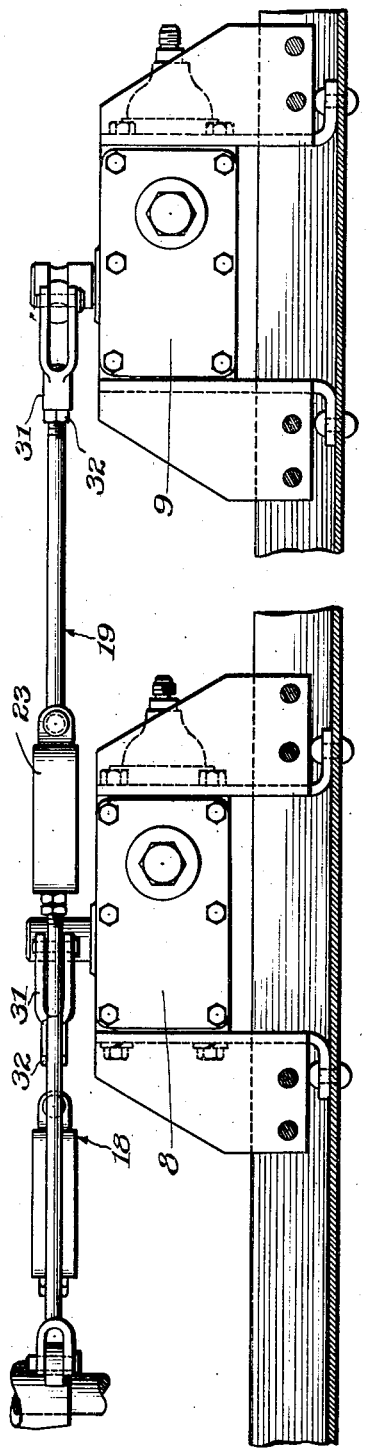
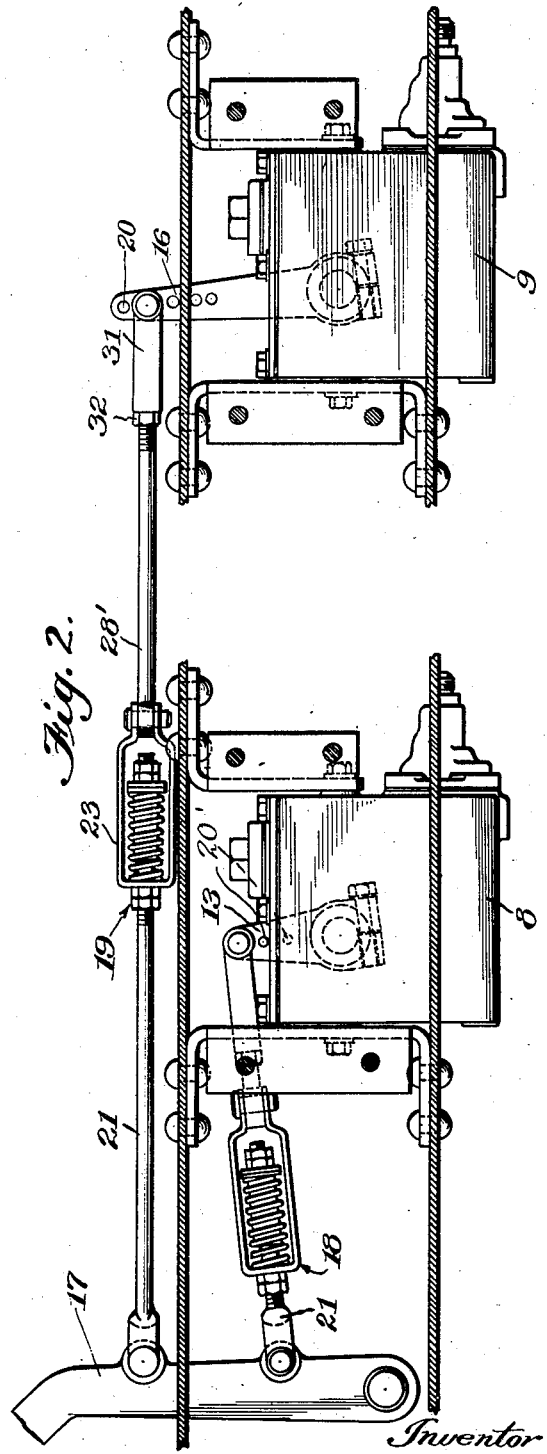
Inventor
Herbert C. Bowen
By Williams, Bradbury, McCaleb & Hinkle
Attys.

Patented Aug. 14, 1934

1,969,872

UNITED STATES PATENT OFFICE 1,969,872

EQUALIZER FOR HYDRAULIC BRAKES

Herbert C. Bowen, Detroit, Mich., assignor to Hydraulic Brake Company, Detroit, Mich., a corporation of California Application July 20, 1928, Serial No. 294,262

7 Claims. (Cl. 188—152)

This invention relates to a brake mechanism, and more particularly to an apparatus for correlating the pressures in several pressure systems used in connection with the brake mechanism of a motor vehicle. In many cases it is desirable to use a separate pressure system for the front and rear wheel brakes of a motor vehicle.

An object of the invention is to provide an apparatus in which the proper relative pressures may be maintained in different pressure systems.

A further object of the invention is to provide a brake mechanism in which a plurality of pressure systems may be operated from a common operating means to effect different pressure results in the different pressure systems.

A further object of the invention is to provide an apparatus for preventing excessive pressures from being produced in any of the pressure systems used in connection with a brake mechanism.

A further object of the invention is to provide an apparatus for obtaining the proper sequence of operation of the front and rear wheel brake mechanisms.

Other objects and advantages will appear as the description proceeds.

A complete understanding of the invention may be had by reference to the following description taken in conjunction with the accompanying drawings, in which Fig. 1 is a schematic representation embodying the invention showing a separate pressure device for the front and rear wheel brakes;

Fig. 2 is a fragmentary side elevation of the apparatus embodying the invention;

Fig. 3 is a plan view of the apparatus shown in Fig. 2; and

Fig. 4 is a longitudinal sectional view of a link mechanism through which the pressure devices are actuated.

Referring to the drawings, and more particularly to Fig. 1, a fluid pressure operated system is illustrated in connection with a hydraulic brake system for a motor vehicle in which the front wheel brakes 6 and the rear wheel brakes 7 are actuated by separate pressure devices 8 and 9 respectively. The pressure device 8 comprises a piston 11, which may be reciprocated in the cylinder 12 to produce a pressure in the fluid system by means of a lever 13. The pressure device 9 similarly consists of a piston 14, which may be reciprocated in the cylinder 15 to produce a fluid pressure by means of a lever 16. The levers 13 and 16 are connected through links 18 and 19 respectively to a common manually operated pedal 17.

Each of the links 18 and 19 comprises a bifurcated rod 21, which is attached at its bifurcated end to the pedal 17, and the other end, which is threaded, is adapted to be inserted in an aperture 22 of a clevis 23. Surrounding the threaded rod 21 is a sleeve 24, which is slidably mounted thereon and is provided at one end with a flange 25. A spring 26 is interposed between the sleeve and the clevis and is held under a predetermined tension by nuts 27 and 28 which are threaded upon the rod 21. The movement of the rod 21 with respect to the clevis 23 is limited by the distance between the end of the sleeve and the aperture in the clevis so that if the spring 26 should be accidentally broken the brakes could still be applied to stop the vehicle. A threaded rod 28' is attached to the clevis by means of a pin 29 and is threaded into a bifurcated attaching member 31, one of the forks of which is shown broken away. The attaching member 31 of the link 18 serves to attach the link to the lever 13 and the attaching member of the link 19 serves to attach the link 19 to the lever 16. The distances between the manually operated pedal 17 and the levers 13 and 16 may be adjusted by rotating the rods 28' within their attaching member 31, and when the proper adjustment is attained the rods are locked against rotation by means of the lock nuts 32.

The lever 16 is provided with a plurality of holes 20 located at different distances from the pivotal point of the lever to which the attaching member of the link 19 may be connected for the purpose of varying the effective lever arm of the lever 16. If the effective lever arm of the lever 16 is shortened, the movement of the piston 14 with respect to the piston 11 will be increased for a given movement of the pedal 17, and conversely, a lengthening of the effective lever arm of the lever 16 will decrease the movement of the piston 14 with respect to the piston 11 for a given movement of the pedal 17. The lever 13 may be similarly provided with holes 20' for purposes of adjustment. By varying the relative amount of movement of the pistons 11 and 14 the rate at which the pressure is built up in the two pressure devices for a given pedal movement may be controlled.

In adjusting the application of the brakes, the rear wheel brakes 7 are adjusted first by properly adjusting the length of the link 19. When the rear wheel brakes have been adjusted, the front wheel brakes 6 are adjusted in such a manner that the application of the front wheel brakes will take effect slightly after the application of the rear wheel brakes. To accomplish this result, the link 18 is made long enough to retard the application of the front wheel brakes, since the longer the link the more the application of the brake will be retarded.

As the lever 17 is depressed to apply the brakes, the links 18 and 19 at first as substantially rigid connectors actuate the pivoted levers 13 and 16, respectively, to move the pistons 11 and 14 within the cylinders 12 and 15 in a pressure producing direction. The initial movement of the pistons is an idling movement until such time as the inlet ports 11' and 14' of the cylinders are closed by, for example, the pistons 11 and 14, respectively, and thereafter the movement is a pressure producing movement.

The adjustable connections between the rods 28' and the attaching members 31, and the adjustments permitted by the holes 20 and 20' enable me to vary or to adjust the sequence of operation of the brake mechanisms in that they may be employed to vary or to adjust the piston positions at which maximum braking pressures are applied, or in other words the lengths of the pressure producing strokes or movements and hence the lengths of piston strokes or movements; and the times required for the idling and pressure producing movements as well as the relative speeds of the pistons independently of each other.

After this idling, one of the pistons, for example the piston 14 first, and thereafter the piston 11, causes the rear wheel brakes and then the front wheel brakes, respectively, to move to a braking position. A further movement of the lever 16 under the force applied at the lever 17 would tend to build up rapidly a very high pressure in the pressure device 9 before the pressure in the pressure device 8 has attained its maximum value. This rapid building up of pressure in the pressure device 9 would tend to retard the depression of the lever 17, and therefore to retard the building up of the desirable pressure in the device 8.

The spring 26 is, however, of such capacity as to retard the rapid increase of pressure in the pressure device 9 before the pressure therein reaches a maximum and while the pressure in the pressure device 8 is approaching a maximum value. By means of a spring 26 with the proper characteristics, as soon as the pressure in the device 9 exceeds a certain value corresponding to the tension of the spring, this spring will be flexed to prevent the rapid building up of pressure in the device 9 and to allow a further pressure to be built up in the pressure device 8. Since the pressure in this device 8 will not have reached its maximum value at the time when the pressure in the device 9 reaches its maximum value, a further depression of the pedal 17 results in the pressure in the device 8 reaching its maximum value, after which a further force applied at the pedal causes the springs in both links 18 and 19 to be flexed to prevent the pressure from exceeding safe limits before the pedal reaches the end of its stroke.

Although in the preferred embodiment of this invention the brakes upon the rear wheels are applied with slightly greater pressure at any pedal position than the brakes upon the front wheels for that pedal position, it is to be understood that this is not an essential feature of the invention as there may be instances, for example, with trucks more heavily loaded at the forward end than at the rear, where the pressure should be applied with greater force upon the forward brakes than upon the rear. No matter how the brakes may be adjusted initially, the wear on the front and rear wheel brake linings will be somewhat different and the compensating devices 23 in the rods 18 and 19 will prevent an excessive braking effect occurring on one set of wheels in the event the brakes on the other set of wheels either wear more rapidly or are improperly adjusted after wear. If either of the compensating devices moves off its normal position the operator will immediately be aware of this movement from the slight shock or hammer effect felt through the foot pedal when the compensating mechanism returns to its normal position. When the pedal 17 is operated with sufficient force to compress the spring 26, the nuts 27 are pulled away from the end of the clevis 23. As soon as the operator relieves part or all of the pressure on the pedal 17, the compressed spring 26 will expand, thereby pulling the nuts 27 into contact with the end of the clevis 23 and causing a slight hammer effect which can be felt or which is perceptible by the operator. This will serve as an indicator to the operator that one set of brakes is adjusted more closely than the other and should be readjusted.

It will be seen, therefore, that the link mechanisms 18 and 19 may be adjusted to control the sequence of pressures in the separate pressure systems and at the same time control the pressures and prevent them from exceeding a certain chosen limit. When the links 18 and 19 are placed in the upper holes provided in the levers 13 and 16, the links 18 and 19 are located farther from the pivot points of the levers 13 and 16. A given movement of the foot pedal 17, therefore, produces less rotation of the levers 13 and 16 about their respective axes and consequently shorter strokes of the pistons 11 and 14 than will be produced when the springs 18 and 19 are connected at lower apertures of the levers 13 and 16. In the latter case the links are closer to the pivot points of the levers 13 and 16 and the same movement of the foot pedal 17 produces greater rotation of the levers 13 and 16 and thereafter correspondingly greater movement of the pistons 11 and 14. The rate of pressure increase in the pressure systems for a given pedal movement may be controlled by adjusting length of the lever arm of the levers to which the link mechanisms are connected.

The apparatus has been described and illustrated in connection with separate pressure systems for brake mechanisms of motor vehicles. It will readily be seen that the invention has many other applications and many modifications may be made without departing from the spirit and scope of the invention, which is to be limited only by the appended claims.

I claim:

1. In a fluid operated brake system for a vehicle having two front and two rear wheels, fluid pressure operated brake mechanisms associated with each of said wheels, a master cylinder connected with the brake mechanism associated with said two rear wheels, a second master cylinder connected with the brake mechanism associated with said two front wheels, pistons reciprocable in said master cylinders and capable of a limited amount of idle movement therein, a single manually operated element for reciprocating said pistons, yieldable means connected to said manually operated element for limiting the pressures created in said cylinders, and adjustable means between the last said means and said pistons for providing a predetermined sequence of effective operations of said pistons.

2. In a fluid operated brake system, a plurality of fluid pressure operated brake mechanisms, a plurality of master cylinders for operating said brake mechanisms; pistons in said master cylinders, said pistons being capable of idling therein, a single element for operating said pistons, and adjustable means connecting said element with said piston for varying the idling speeds of said pistons to vary the sequence of operation of said brake mechanisms.

3. In a fluid operated brake system, a plurality of fluid pressure operated brake mechanisms, a plurality of master cylinders for operating said brake mechanisms, pistons in said master cylinders, said pistons being capable of idling therein, a single element for operating said pistons, and adjustable means connecting said pistons with said element for varying the time of idling of each said piston and thereby the sequence of operation of said brake mechanisms, said means including means for limiting the pressures produced in said cylinders.

4. In a fluid operated brake system having a plurality of fluid pressure operated brake mechanisms and a plurality of operating devices capable of idling and pressure producing movements, associated actuated devices for said operating devices comprising adjustable means for independently varying the operating speeds of said operating devices whereby to vary the sequence of operation of said brake mechanisms, and yieldable means for retarding the pressure producing movements and for limiting the maximum operating pressures of said brake mechanisms.

5. In a fluid operated brake system, a plurality of fluid pressure operated brake mechanisms, a plurality of master cylinders having pistons therein for operating said brake mechanisms, said pistons being capable of idle movement in said cylinders, and adjustable piston operating means for varying the piston speeds during such idle movements whereby to vary the operation sequence of said brake mechanisms.

6. In a fluid operated brake system, a plurality of fluid pressure operated brake mechanisms, a plurality of master cylinders having pistons therein for operating said brake mechanisms, said pistons being capable of idling and pressure producing movements in said cylinders, a single element for operating said pistons, a clevis operatively connected to each said piston, and a spring in each said clevis, connecting said single element to each said piston, each said spring being of sufficient rigidity as to provide a substantially rigid connection during the idling movements of said pistons but being yieldable at a predetermined pressure whereby to retard the pressure producing movements of said pistons.

7. In a fluid operated brake system, a fluid pressure operated brake mechanism, a master cylinder having a piston therein for operating said brake mechanism, said piston being capable of idling and of building up the fluid pressure to the braking pressure of said brake mechanism, means for operating said piston in said cylinder, a connection with the last said means, a connection with said piston, a clevis secured to the last said connection, the first said connection having a portion extending into said clevis, a spring around said portion in said clevis, said connections, clevis and spring constituting a yieldable connection between said operating means and said piston for retarding the building up of operating pressures to the maximum braking pressure by said piston in said cylinder, and means for adjusting said yieldable connection to adjust the maximum braking pressure position of said piston.

HERBERT C. BOWEN.